(12) United States Patent
Lejeune

(10) Patent No.: US 9,681,178 B2
(45) Date of Patent: Jun. 13, 2017

(54) DISTRIBUTED PRESENTATION SOFTWARE FOR MULTIPLE INSTANTIATIONS IN HOME NETWORK

(71) Applicants: Sony Corporation, Tokyo (JP); Sony Electronics Inc., Park Ridge, NJ (US)

(72) Inventor: Stephane Lejeune, San Diego, CA (US)

(73) Assignees: Sony Electronics Inc., Park Ridge, NJ (US); Sony Corporation, Tokyo (JP)

( * ) Notice: Subject to any disclaimer, the term of this patent is extended or adjusted under 35 U.S.C. 154(b) by 412 days.

(21) Appl. No.: 14/181,934

(22) Filed: Feb. 17, 2014

(65) Prior Publication Data

US 2014/0165103 A1     Jun. 12, 2014

Related U.S. Application Data

(63) Continuation of application No. 13/044,756, filed on Mar. 10, 2011, now Pat. No. 8,776,164, which is a continuation of application No. 12/410,001, filed on Mar. 24, 2009, now Pat. No. 8,015,589.

(60) Provisional application No. 61/190,988, filed on Sep. 3, 2008.

(51) Int. Cl.
*H04N 21/43* (2011.01)
*H04N 21/436* (2011.01)
*H04L 12/28* (2006.01)
*H04N 7/10* (2006.01)
*H04N 21/61* (2011.01)
*H04N 21/81* (2011.01)

(52) U.S. Cl.
CPC ... *H04N 21/43615* (2013.01); *H04L 12/2814* (2013.01); *H04N 7/106* (2013.01); *H04N 21/6118* (2013.01); *H04N 21/8173* (2013.01); *H04L 2012/2849* (2013.01)

(58) Field of Classification Search
None
See application file for complete search history.

(56) References Cited

U.S. PATENT DOCUMENTS

| 5,969,748 A | * | 10/1999 | Casement | H04N 5/44543 |
| | | | | 348/E5.105 |
| 7,853,982 B2 | * | 12/2010 | Park et al. | 725/132 |
| 2008/0288996 A1 | * | 11/2008 | Walter | H04N 21/443 |
| | | | | 725/131 |
| 2014/0268387 A1 | * | 9/2014 | Park et al. | 360/31 |

* cited by examiner

*Primary Examiner* — Cai Chen
(74) *Attorney, Agent, or Firm* — John L. Rogitz

(57) ABSTRACT

One and only instance of a video service model component (for example, an electronic program guide (EPG) model description) is executed in a home network gateway, with multiple instantiations of a view/controller module associated with the model module being generated, one for each display device seeking to simultaneously display the video service. In this way the functionality of a single video service model is shared in the network without requiring the underlying model module itself to be replicated.

24 Claims, 2 Drawing Sheets

Figure 3:
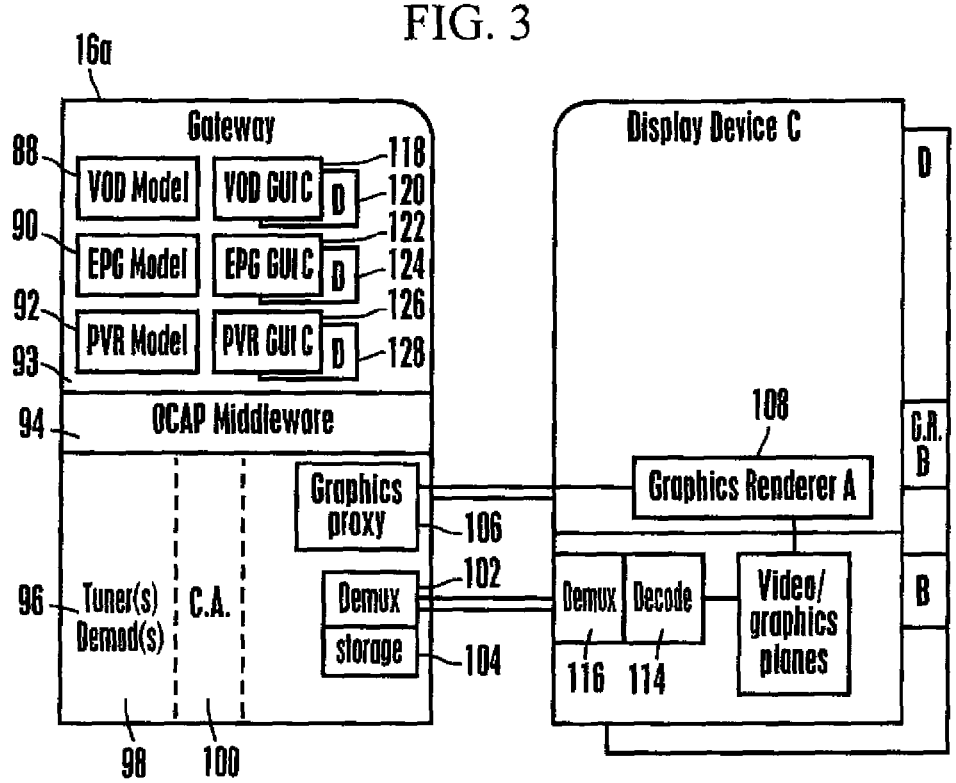

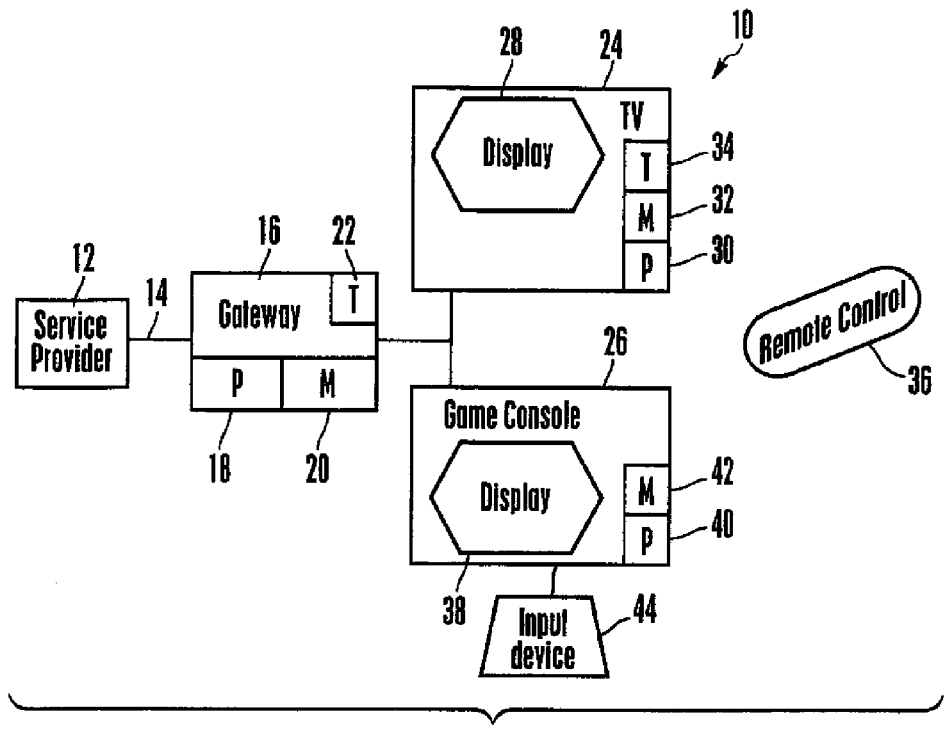
FIG. 1
FIG. 2
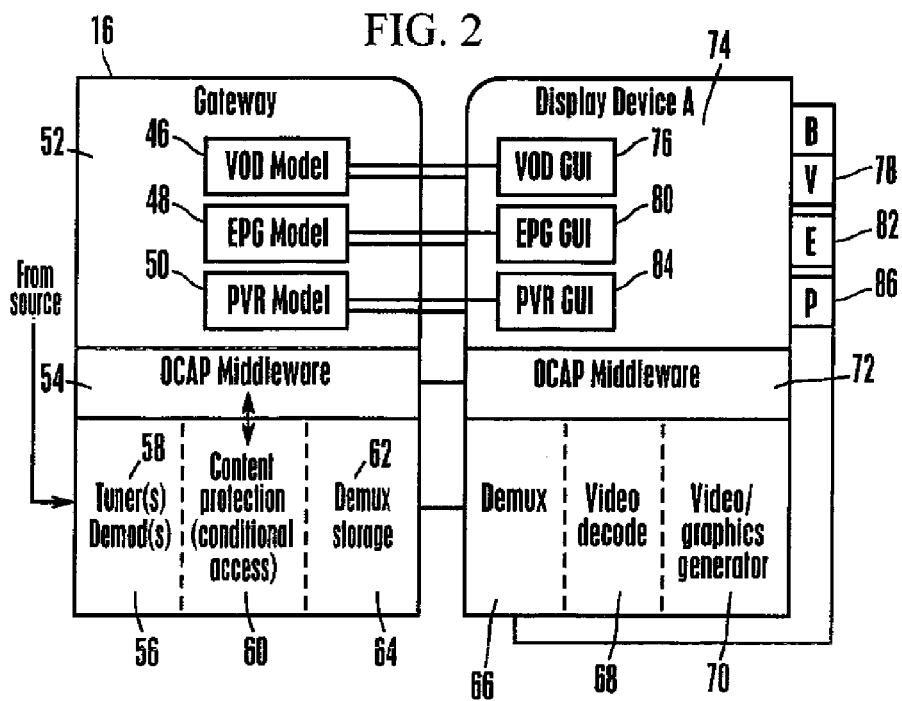

DISTRIBUTED PRESENTATION SOFTWARE FOR MULTIPLE INSTANTIATIONS IN HOME NETWORK

This application claims priority from U.S. provisional application 61/190,988, filed Sep. 30, 2008.

FIELD OF THE INVENTION

The present invention relates generally to home networks having multiple display devices requiring multiple instantiations of presentation software.

BACKGROUND OF THE INVENTION

Recent trends have provided receivers that support not just conventional one-way communication from the signal head end to the receiver, but also two-way communication, to support so-called "interactive digital video", Examples of interactive digital video include pay-per-view, in which a receiver user can input certain requests and commands, as well as purchase orders, for pay-per-view programming using the receiver, and video-on-demand, entailing many of the same communication considerations. Also, so-called "switched digital" can be implemented using two-way receivers. Switched digital in essence allows all the viewers in a particular area to in essence report back to the head end what channel they are viewing, so that, for instance, the head end may take intelligent steps with respect to bandwidth such as ceasing transmission into the area of a channel that is not currently being viewed by anyone in the area and thereby releasing bandwidth for other uses.

Partly to support such two-way interactive digital video, the Open Cable Application Platform (OCAP) has been introduced. In effect, OCAP defines an application platform's basic functionality and standardizes on an API (application program interface). The basic functionality allows applications to be detected on the signal and download dynamically from the signal head-end. The API implemented by the receiver platform allows these downloaded software applications, to execute and communicate with the receiver through a common standard interface to manage the receiver's resources and exploit its functionality. An OCAP interface also allows the application to communicate through the receiver's communication port with the TV signal head end and with the home network. In this way, for example, viewer purchases of video-on-demand may be facilitated through a downloaded VOD application, with the purchased video then transmitted from the head end to the receiver, to be decrypted by the cable card of the receiver and then rendered through the display output.

When multiple users in a same household want to interact with the service simultaneously and independently of each other the industry has chosen the simple path of supporting the execution one instance of the application per user by provisioning a complete OCAP environment per user, requiring the replication of a complete receiver's hardware and middleware per user. Although this approach is very expensive it has the benefit of being very simple in that the OCAP application instances can always rely on all the cable resources of the receiver be available to them at all times and hence don't have to cope with the burden of sharing resources with another instance as each instance executes in its independent OCAP environment.

SUMMARY OF THE INVENTION

As explained above, the current approach is very expensive not only because multiple instantiations of a same application needs to be supported, currently requiring multiple independent OCAP environments, but also because each application instance has a considerable memory footprint requiring that memory usage to increase linearly with the number of supported instances.

A method includes splitting the application implementation into two instantiate-able parts. A first part of which only a single instance can exist at all time. And a second piece of which multiple instances can be created to support multiple users. The functionality provided by the first part is than made available and shared amongst the multiple instances of the second part.

As understood herein, in a home network in which multiple presentation devices might be used to present a video service simultaneously and independently of each other, multiple instances of the view/controller modules must be executed. The view/controller component represents the software typically accessing the hardware required by the user interface and maintains its state information. As further understood herein, it is desirable to minimize resource usage in a home network, including use of software-implemented model components. The model component represents the software typically accessing the network hardware, its state and maintains the local service representations of the network services.

With the above recognition in mind, a method includes instantiation of one and only instance of a video service model component in a home network accessible and shareable amongst multiple instantiations of the view/control component. The method includes instantiating at least first and second view/controller modules each associated with the model component. The first view/controller module is associated with a first display device to display, on the first display device/remote control input, a video service embodied by the model component. On the other hand, the second view/controller module is associated with a second display device/remote control input to display, on the second display device simultaneously with the first display device, the video service.

The video service may include, e.g., an electronic program guide (EPG), a video on demand (VOD) application, a personal video recorder (PVR) application, etc. The model module would than for example use the network hardware to build the respective meta data databases and make these available to the view/controller modules. The view/controller modules may be exported from a home network gateway to the display devices or executed on a home network gateway with a respective result thereof being provided to each respective display device. The network can be an interactive television network such as, e.g., an Open Cable Application Platform (OCAP) network.

In another aspect a system includes processor and a computer readable storage medium bearing instructions executable by the processor for sharing a functionality of a single video service model module among multiple display devices simultaneously in a network without requiring the model module to be replicated.

In another aspect, an apparatus has a processor executing logic including accessing a video service composed of a shareable model module and a non-shareable view/controller module. The logic includes signaling that the model module may not be replicated and signaling that the view controller module may be replicated or exported multiple times. In non-limiting example embodiment signaling, particularly when the end device is a disk player such as a Blu-Ray® player, may be accomplished using the principles of the present assignee's co-pending U.S. patent application Ser. No. 12/355,578, filed Jan. 16, 2009, incorporated herein by reference.

In another embodiment, an apparatus has a processor executing logic including, to support video service applications that have not been split into a model module and a separate view/controller module, providing a front-end OCAP middleware API on a first display device while using a call to invoke implementation of the front-end OCAP middleware API on a home network gateway associated with a home network on the fly, such that when a call to middleware associated with the front-end OCAP middleware API is detected that is not supported by the middleware, the call is automatically invoked on the gateway.

The details of the present invention, both as to its structure and operation, can best be understood in reference to the accompanying drawings, in which like reference numerals refer to like parts, and in which:

BRIEF DESCRIPTION OF THE DRAWINQS

Figure 4:
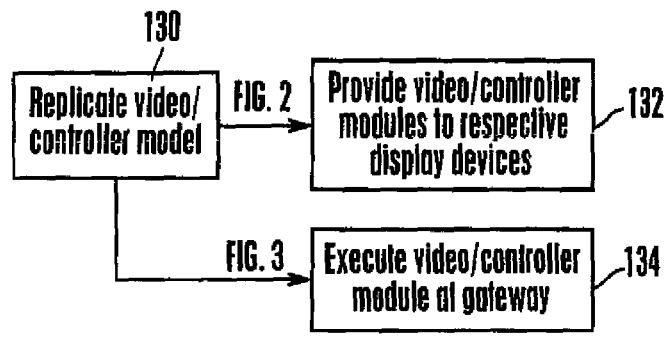

FIG. 1 is a simplified block diagram of a home system in accordance with present principles;
FIG. 2 is a block diagram of a first example implementation;
FIG. 3 is a block diagram of a second example implementation; and
FIG. 4 is a flow chart of example logic.

DETAILED DESCRIPTION OF THE PREFERRED EMBODIMENT

While OCAP is presented herein as an example environmental application for present principles, it is to be understood that present principles apply to interactive video paradigms including, for example, advanced common application platform (ACAP), multimedia home platform (MHP), Association of Radio Industries and Business (ARIB-B23) (interactive TV protocol in Japan), Ginga-J (interactive TV protocol in Brazil), and Blu-ray Disk Java (BD-J).

Referring initially to FIG. 1, cost in a home network 10 is reduced by separating a video service application into plural components, one not being replicated to minimize resource requirements and one being replicated as many times a needed to provide the video service simultaneously and independently to display devices in the network 10 to implement the functionality of the application. More particularly, a single instance is implemented of a shareable video service functionality, whereas multiple module instances of the non-sharable functionality of the service coexist to support independent presentation on multiple rendering devices simultaneously. In this way, the resource requirements for supporting a home environment with multiple presentation devices is reduced using a centralized gateway.

As shown in FIG. 1, the gateway 16 communicates with a service provider 12 over a wired or wireless link 14 such as a satellite link, a coaxial cable, etc. such that television programming and services are provided to the network 10 by the service provider 12, and information may be sent from the gateway 16 back to the service provider 12. The network 10 typically is an in-home network that includes plural components including a gateway device 16 that communicates with the service provider 12. The gateway device 16 may be, without limitation, a computer server, set-top box, Internet router, etc. In any case, the gateway device 16 typically includes a gateway processor 18 accessing one or more computer readable storage media 20 such as but not limited to solid state storage and disk-based storage. The gateway 16 may also include a television tuner 22.

FIG. 1 shows that the gateway 16 communicates with plural networked components within the home network 10, including, without limitation, video display components such as a TV 24 and BD player 26. The TV 24 may be an analog and/or digital TV and includes a display 28 such as a standard definition or high definition matrix display. The TV 24 also typically includes a TV processor 30 accessing one or more computer-readable storage media 32. The TV 24 may include a TV tuner 34 communicating with the TV processor 34, which in turn may receive user commands from a wireless remote control 36.

The BD player 26 may include a display 38 and a BD player processor 40 accessing one or more computer-readable storage media 42. The player processor 40 may receive user commands from a game controller 44.

Other components may be included in the network 10, including, e.g., computers, personal digital assistants, telephony devices, home theaters, disk players, personal video recorders (PVR), etc., each with its own processor, data storage medium, and possibly video display. The gateway 16 may be implemented by a display device in the network. In any case, the logic herein may be implemented by one or more of the processors described herein.

FIG. 2 shows an example OCAP implementation in which the gateway 16 may include software-implemented video service models, including a VOD model 46, an EPG model 48, and a PVR model 50. The models 46-50 describe, e.g., screen layouts of the video services they embody. Together the models 46-50 exist in an OCAP environment including the front end application programming interface (API) 52.

OCAP signaling from the service provider in the embodiments shown in FIGS. 2 and 3 includes signaling that differentiates the signaling of a model module, which is shareable among plural associated view/component modules, is not to be replicated, from the signaling of a non-shareable view/controller module associated with the model module may be replicated. Thus, applications are written in modular format with a shareable model module and a non-shareable, replicable view/controller module.

In the architecture below the API 52 and communicating therewith is a OCAP middleware layer 54 containing OCAP middleware (not shown for simplicity) including a local OCAP application management tool, and OCAP front-end communication interface, and a Java virtual machine (VM). The middleware layer 54 (using, e.g., the Java VM) can communicate with a physical layer 56 which includes one or more tuners/demodulators 58 for receiving video data from the service provider 12 and communicating the data to a content protection device 60 such as a cable card for providing conditional access to video and an upstream modulator for communicating back to the service provider head-end equipment. The middleware layer 54 may communicate with the content protection device 60. In turn, the content protection device 60 sends data to a demultiplexer 62 in a region 64 that may also include data storage and an interface to the physical layer of the display devices 24, 26 such as a DFAST2 DTCP interface.

Indeed, as shown in FIG. 2 a display device "A" such as the TV 24 may receive at a demultiplexer 66 data from the physical layer 56 of the gateway 16. The data may be passed onto a video decoder 68 and then to a video/graphics generator 70, including, e.g., a graphics plane, a video plane, and a background plane. The physical layer of the gateway 16 communicates with the physical layer of each active display device in the network in accordance with discussion above.

The middleware layer 54 of the gateway 16 also typically communicates with a middleware layer 72 of each active display device to effect, e.g., application signaling using, for instance, Universal Plug-n-Play (UPnP). In order to also support applications that haven't been split in two parts, one running on the front-end OCAP API and one running on the back-end API, one option is to also provide the front-end OCAP middleware API on the display device but using for example Remote Method Invocation (RMI) to invoke the implementation of it on the gateway device. This can be done on the fly, meaning when a call to the middleware is detected that is not supported by the middleware a RMI call would automatically be invoked on the Gateway that has forwarded the application. In any case, the middleware layer 72 of a display device should typically include, without limitation, a GEM API and a Java AWT for communicating with an OCAP application layer 74 of the display device and with the graphics library 70, and a local OCAP application management tool.

As intended by the embodiment of FIG. 2, each video service view/controller module, one view/controller module per display device, communicates with respective shared unique instantiation of an associated model 46-50. Thus, for example, a VOD UI 76 in the display device "A" and a VOD UI 78 in a display device "B" communicates with the shared VOD model Likewise, the EPG GUI 80 in the display device "A" and the EPG GUI 82 in the display device "B" both communicate with the EPG model 48. The PVR GUI 84 in the display device "A" and the PVR GUI 88 in the display device "B" communicate with the PVR model 50. The view/controller modules code may be stored within the gateway 16 and then exported to respective display devices in the network 10 for instantiation thereof by each display device to present the respective video services, in cooperation with information received from the associated one and only one video service model in the gateway device 16. Centralizing the storage of not only the model module but also the view/controller module of the application in the gateway again reduces the overall resource requirements compared to storing the application in each display device.

FIG. 3 shows another example X-window based implementation in which a gateway 16a may include software-implemented video service models, including a VOD model 88, an EPG model 90, and a PVR model 92. The models 88-92 describe, e.g., the protocols of the video services they reflect. Together the models 88-92 exist in an OCAP front-end application environment with access to the OCAP front-end application programming interface (API) 93. In the architecture below the API 93 and communicating therewith is an OCAP middleware layer 94 containing OCAP middleware (not shown for simplicity) including an OCAP middleware interface communicating with the API layer 93 and a Java virtual machine (VM). The middleware layer 94 (using, e.g., the Java VM) can communicate with a physical layer 96 which includes one or more tuners/demodulators 98 for receiving video data from the service provider 12 and communicating the data to a content protection device 100 such as a cable card for providing conditional access to video. The Java VM of the middleware layer 94 may communicate with the content protection device 100. In turn, the content protection device 100 sends data to a demultiplexer 102 in a logical region that may also include data storage 104 and an interface to the physical layer of display devices labeled "C" and "D" in FIG. 3 such as a DTCP/IP interface.

Furthermore, the physical layer of the gateway 16a may include a graphics proxy 106 which communicates information received from the API layer 93 to a rendering engine 108 of a display device "C" and communicates events received from the display device "C" to its associated graphics proxy. In one embodiment the proxy 106/rendering engine 108 may be implemented based on an "X Window" or "Voodoo" client-server system and their ability to virtualize the back-end resources provided by the remote display devices. Creating a virtual OCAP back-end environment on top of each virtualized back-end resource allows recreating the same application environment as in Example 2, allowing for multiple view/controller instances to coexist each within their own virtual OCAP back-end environments. These virtual OCAP back-end environments are closely related to the back-end resources and hence the applications instances coexisting in a same virtual environment share these same back-end resources. Although overall there are multiple instances of a same application, there is still only one instance of each application that can coexist in a single virtual OCAP back-end environment. Through this virtualization, the support of multiple instances of a same application has no impact on the complexity of the applications themselves as they remain unaware of the other instances. For example when one application wants to communicate with another application through Inter Xlet Communication (IXC), it can still use the organization id and application id to identify the application. It is up to the middleware to identify the precise instance based on the commonly shared virtual OCAP back-end environment.

The engine 108 drives the back-end resources associated with the four "graphical content" pipelines processing the subtitles, background, video and application graphics content and mapping them in a controllable way onto single screen. The back-end resources may include the demultiplexer, the Audio/Video/Subtitle and Background decoders, graphics compositor, clip/scale and positioning hardware and an alpha blender. The engine 108 may receive its background/Graphics content and commands from its associated graphics client on the gateway 16a and send events back to the gateway. As the data exchanged over the home network might contain transactional information the path may be encrypted using for example an ssh session. The gateway public host key may also be stored in the display devices for automating subsequent session setup. The audio, video and subtitle decoders 114 all receive their data from a display demultiplexer 116, which in turn receives information from the gateway demultiplexer 102 as shown. These contents may require some type of link protection, like DTCP/IP.

In the embodiment shown in FIG. 3, multiple view/controller modules can be provided, one for each device "C", "D" seeking to render a video service simultaneously with each other, but in contrast to FIG. 2 the video-controller modules are maintained at the gateway 16a, with their outputs being sent to the display devices "C", "D". Specifically, when the devices "C", "D" wish to present a VOD GUI at the same time as each other, the VOD model 88 communicates with respective plural instantiations 118, 120 of an associated VOD view/controller module. Likewise, the EPG model 90 communicates with EPG GUI 122, 124 in the event that both devices "C", "D" wish to present an EPG GUI, while the PVR model 92 communicates with PVR GUI 126, 128 in the event that both devices "C", "D" wish to present a PVR GUI.

Block 130 of FIG. 4 indicates that when a display device in the network 10 wishes to present a video service as indicated by, e.g., the receipt of UPnP request to access a service from a gateway device, the appropriate view/controller module is uniquely instantiated within the OCAP back-end environment, virtual or not, associated with the display device desiring to present the video service. At block 132 when the embodiment of FIG. 2 is used, the view/controller modules are exported to each requesting display device. Subsequently, the view/controller module instances communicate with the single model module instance at the gateway as needed to render the service.

In contrast, when the architecture of FIG. 3 is used the logic moves from block 130 to block 134, wherein the gateway executes the view/controller modules in cooperation with the model module. The output of each view/controller module is then sent to its respective display device for presentation of the video service.

Signaling for applications that require multiple instantiation may be differentiated from applications that require single instantiation. An example way to differentiate between applications that require a different instance per presentation device from applications that require a single instance is to define a new flag and inserted it in the XAIT.

While the particular DISTRIBUTED PRESENTATION SOFTWARE FOR MULTIPLE INSTANTIATIONS IN HOME NETWORK is herein shown and described in detail, it is to be understood that the subject matter which is encompassed by the present invention is limited only by the claims.

What is claimed is:

1. Device comprising:
at least one computer memory that is not a transitory signal and that comprises instructions executable by at least one processor for:
implementing one and only instance of a video service model component in a home network, the video service model component being established by software accessing hardware required by first and second user interfaces of respective first and second display devices, wherein to minimize resource usage, at least first and second software-implemented view/controller modules are used at least in part by:
instantiating the at least first and second view/controller modules each associated with the model component, the first view/controller module being associated with the first display device to display, on the first display device, a video service provided at least in part by the video service model component, the second view/controller module being associated with the second display device to display, on the second display device, the video service provided at least in part by the video service model component such that a video service application which is not itself a video stream is separated into one and only one video service model component which is not replicated in the home network to minimize resource requirements, and a view/controller module which is replicated at least once to establish the first and second view/controller modules to provide the video service to at least the first arid second display devices in the home network to implement the functionality of the video service application, wherein a single instance is implemented of a shareable video service functionality and multiple module instances of a non-sharable functionality of the video service coexist to support independent presentation on multiple rendering devices simultaneously to reduce resource requirements fur supporting a home environment with multiple presentation on devices.

2. The device of claim 1, wherein the video service is an electronic program guide (EPG).

3. The device of claim 1, wherein the video service is a video on demand (VOD) application.

4. The device of claim 1, wherein the video service is a personal video recorder (PVR) application.

5. The device or claim 1, wherein view/controller modules are instantiated by exporting the view/controller modules from a home network gateway to the display devices.

6. The device of claim 1, wherein view/controller modules are instantiated by replicating the view/controller modules at a home network.

7. The device of claim 1, wherein the instructions are executable for executing view/controller modules on a home network gateway and providing a respective result thereof to each respective display device.

8. The device of claim 1, wherein the network is an Open Cable Application Platform (OCAP) network.

9. The device of claim 8, wherein to support applications that have not been split in two parts, one running on a front-end OCAP application programming interface (API) and one running in a back-end API, a front-end OCAP middleware API is provided on the first display device while using a call to invoke implementation of the front-end OCAP middleware API on a home network gateway associated with the home network, such that when a call to middleware associated with the front-end OCAP middleware API is detected that is not supported by the middleware, the call is automatically invoked on the gateway.

10. The device of claim 5, wherein storage of the model component and view/controller module is centralized in the gateway to reduce overall resource requirements compared to storing the component in each display device.

11. System comprising:
at least one computer memory that is not a transitory signal and that comprises instructions executable by at least one processor for:
sharing a functionality of a single video service model module among multiple display devices simultaneously in a network without requiring the video service model module to be replicated, the video service model module not being a video stream, wherein a virtual OCAP back end environment is created on top of each virtualized back end resource to allow recreating an application environment, allowing for multiple view/controller associated with the video service model module to coexist each, within their own respective virtual OCAP back end environments, the virtual OCAP back end environments being associated with back end resources and hence to application instances coexisting in a same virtual environment sharing the back end resources, whereby multiple instances of a single application are supported without impacting the complexity of the applications themselves.

12. The system of claim 11, wherein instructions are executable tor;
implementing one and only instance of the video service model module;
instantiating at least first and second view/controller modules each associated with the model module, the first view/controller module being associated with a first display device to display,on the first display device, a video service embodied at least in part by the model module, the second view/controller module being associated with a second display device to display, on the second display device simultaneously with the first display device, the video service.

13. The system of claim 11, wherein the video service model module embodies a video service.

14. The system of claim 13, wherein the video service is an electronic program guide (EPC).

15. The system of claim 13, wherein the video service is a video on demand (VOD) application.

16. The system of claim 13, wherein the video service is a personal video recorder (PVR) application.

17. The system of claim 12, wherein the instructions are executable for exporting view/controller modules from a home network gateway to the display devices.

18. The system of claim 12, wherein the instructions are executable for executing view/controller modules on a home network gateway and providing a respective result thereof to each respective display device.

19. The system of claim 12, wherein view/controller modules are instantiated by replicating the view/controller modules at a home network.

20. The system of claim 14, wherein the network is an Open Cable Application Platform (OCAP) network.

21. The system of claim 17, wherein storage of the model component and view/controller module is centralized in the gateway to reduce overall resource requirements compared to storing the component in each display device.

22. Apparatus comprising:
at least one computer memory that is not a transitory signal and that comprises instructions executable by at least one processor to:
access a video service composed of a model module and a view/controller module, at least the view/controller module being a software application, neither the model module nor the view/controller module being a TV program;
establish that the model module may not be replicated; and
establish that the view controller module n may be replicated or exported multiple times.

23. The apparatus of claim 22 wherein the model means embodies a shareable functionality of the video service and respective instantiations of the view/controller module each embody a non-sharable functionality of the video service, the instantiations coexisting to support respective presentations of the video service on the display devices simultaneously.

24. The apparatus of claim 22, wherein the view/controller module is configured for maintaining state information of at least one user interface (UI) and the model module is configured for maintaining a local service representation of network services.

* * * * *